US012810433B2

(12) United States Patent
Ghannam et al.

(10) Patent No.: US 12,810,433 B2
(45) Date of Patent: Nov. 24, 2026

(54) SYSTEMS AND METHODS FOR ALIGNING VEHICLE HEADLIGHTS

(71) Applicant: Ford Global Technologies, LLC, Dearborn, MI (US)

(72) Inventors: Mahmoud Yousef Ghannam, Canton, MI (US); Robert Schroeter, Livonia, MI (US); Todd N. Clark, Dearborn, MI (US)

( * ) Notice: Subject to any disclaimer, the term of this patent is extended or adjusted under 35 U.S.C. 154(b) by 238 days.

(21) Appl. No.: 18/645,917

(22) Filed: Apr. 25, 2024

(65) Prior Publication Data

US 2025/0336071 A1 Oct. 30, 2025

(51) Int. Cl.

| | |
|---|---|
| ***G06T 7/11*** | (2017.01) |
| ***B60K 35/22*** | (2024.01) |
| ***B60Q 1/00*** | (2006.01) |
| ***B60Q 1/04*** | (2006.01) |
| ***G06T 7/13*** | (2017.01) |
| ***G06V 10/60*** | (2022.01) |

(52) U.S. Cl.

CPC ................ *G06T 7/11* (2017.01); *B60K 35/22* (2024.01); *B60Q 1/0023* (2013.01); *B60Q 1/045* (2013.01); *G06T 7/13* (2017.01); *G06V 10/60* (2022.01); *B60K 2360/1438* (2024.01); *B60K 2360/164* (2024.01); *B60K 2360/178* (2024.01); *G06T 2207/30252* (2013.01)

(58) Field of Classification Search

CPC .. G06T 7/11; G06T 7/13; G06V 10/60; B60K 35/22; B60K 2360/178; B60K 2360/164; B60Q 1/0023; B60Q 1/045

See application file for complete search history.

(56) References Cited

U.S. PATENT DOCUMENTS

| | | | |
|---|---|---|---|
| 7,566,851 B2 | 7/2009 | Stein et al. | |
| 8,538,636 B2 | 9/2013 | Breed | |

(Continued)

FOREIGN PATENT DOCUMENTS

| | | | |
|---|---|---|---|
| WO | 2012048795 A1 | 4/2012 | |
| WO | WO-2018095718 A1 * | 5/2018 | ........... B60Q 11/005 |

OTHER PUBLICATIONS

Ying Li, et al., Intelligent Headlight Control Using Learning-Based Approaches, 2011 IEEE Intelligent Vehicles Symposium (IV), Jun. 5-9, 2011, pp. 722-727.

(Continued)

*Primary Examiner* — Syed Haider

(74) *Attorney, Agent, or Firm* — Frank Lollo; Eversheds Sutherland (US) LLP

(57) ABSTRACT

A vehicle including a front camera, left and right headlights, and a processor is disclosed. The front camera may be configured to capture an image of an external surface in front of the vehicle. The left headlight may be configured to illuminate a left zonal area of the external surface, and the right headlight may be configured to illuminate a right zonal area. The processor may map a first set of image pixels to the left zonal area and a second set of image pixels to the right zonal area. The processor may further determine a first illumination intensity associated with the left zonal area, and a second illumination intensity associated with the right zonal area. The processor may perform a predefined action when a difference between the first and second illumination intensities may be greater than a threshold.

20 Claims, 7 Drawing Sheets

(56) References Cited

U.S. PATENT DOCUMENTS

| | | | | |
|---|---|---|---|---|
| 2019/0064811 | A1* | 2/2019 | Du | G01S 13/867 |
| 2022/0080878 | A1* | 3/2022 | Kim | B60Q 1/085 |
| 2023/0211722 | A1 | 7/2023 | Li et al. | |
| 2024/0140300 | A1* | 5/2024 | Tachikawa | B60Q 1/085 |
| 2025/0074291 | A1* | 3/2025 | Jagbrant | G06V 20/582 |

OTHER PUBLICATIONS

Shixiao Li, et.al., Dynamic Adjustment and Distinguishing Method for Vehicle Headlight Based On Data Access of a Thermal Camera, Frontiers in Physics, Sep. 10, 2020, pp. 1-13, 8:354.

* cited by examiner

SYSTEMS AND METHODS FOR ALIGNING VEHICLE HEADLIGHTS

FIELD

The present disclosure relates to systems and methods for aligning vehicle headlights based on dynamic headlight level sensing using images obtained from a vehicle camera.

BACKGROUND

It is known that proper alignment of vehicle headlights enables a vehicle driver to drive the vehicle conveniently during nighttime or when the ambient light may be dark. Proper headlight alignment ensures that the headlights illuminate the road in front of the vehicle to an optimal distance such that the driver can view the road clearly, while at the same time ensuring that the incoming vehicles/traffic do not experience glare from the illuminated headlights. For optimal driving experience, it is also important that both the left and right headlights are aligned with each other, and illuminate the road to the same distance and in the same direction.

Conventional method of headlight alignment requires one or more steps that are performed manually by a vehicle mechanic or owner. Performing such steps manually may result in human-error, and thus suboptimal headlight alignment.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
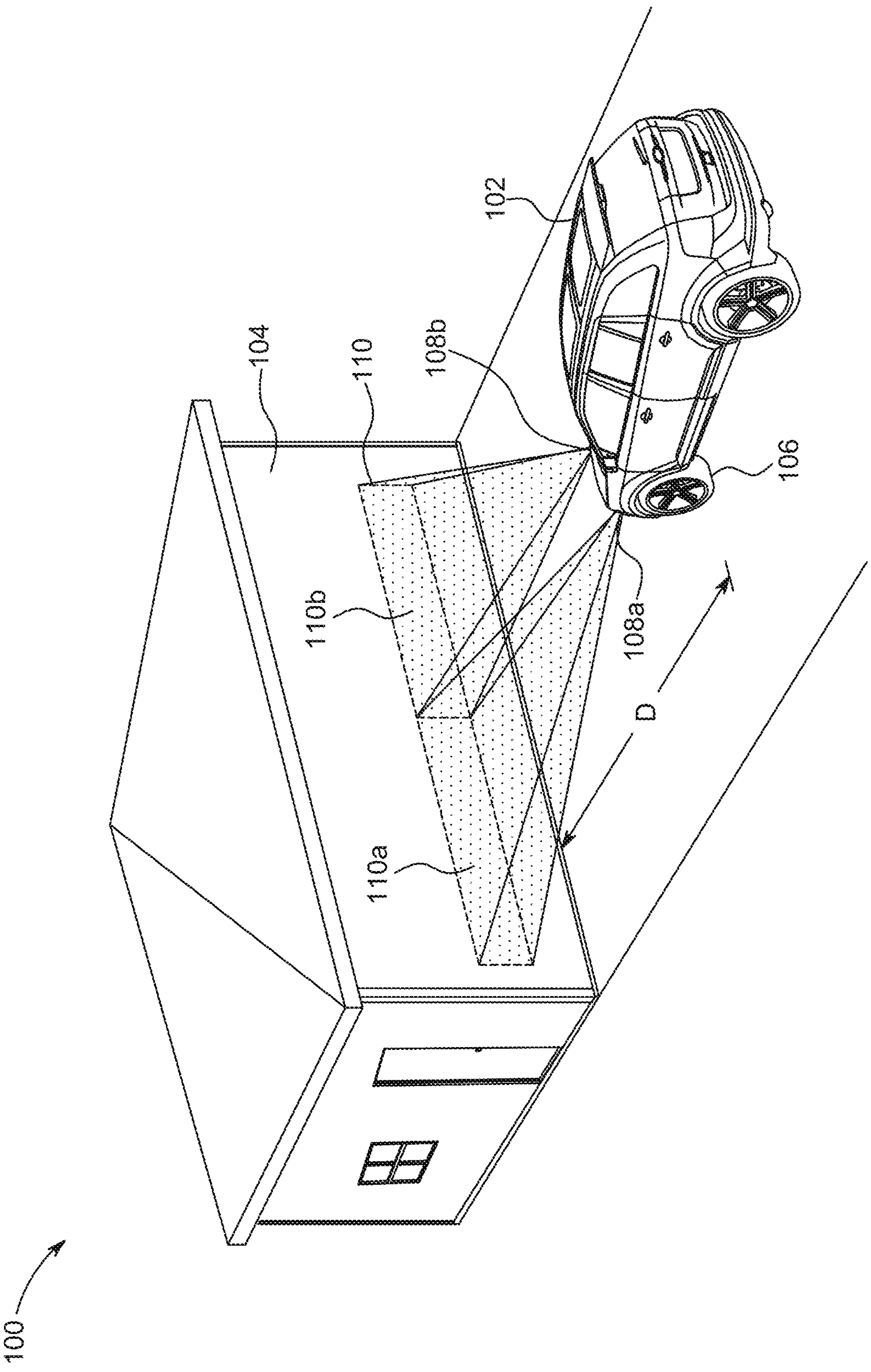
FIG. 1 depicts an environment in which techniques and structures for providing the systems and methods disclosed herein may be implemented.

The present disclosure describes a vehicle that may be configured to determine a misalignment between a left vehicle headlight and a right vehicle headlight, and automatically adjust the headlight alignment or output an alert notification indicating to a vehicle mechanic or owner that the headlights may be misaligned. The vehicle may determine the headlight misalignment by performing dynamic headlight level sensing when the vehicle may be stationed in front of an external surface (e.g., a wall) and at a predefined distance away from the surface/wall. The vehicle may include a front camera that may be configured to capture images of a wall portion that may be within the camera's field of view (FOV), when the headlights may be illuminated and also when the headlights may be switched off. In some aspects, the vehicle may perform the headlight level sensing by executing one or more Artificial Intelligence/Machine Learning (AI/ML) based image processing algorithms on the images captured by the front camera.

In some aspects, a predefined headlight zonal area may get illuminated on the wall when the left and right headlights may be illuminated. Further, within the headlight zonal area, a left zonal area may get illuminated by the left headlight, and a right zonal area may get illuminated by the right headlight. The vehicle may be configured to determine a first illumination intensity associated with the left zonal area illuminated by the left headlight and a second illumination intensity associated with the right zonal area illuminated by the right headlight by analyzing the image captured by the front camera. Specifically, the vehicle may map a first set of image pixels to the left zonal area and a second set of image pixels to the right zonal area, and may determine the first and second illumination intensities by performing pixel analysis of the first and second sets of image pixels.

The vehicle may output an error notification when the first and/or second illumination intensities may be greater than a threshold, indicating to the vehicle mechanic or owner that the left and/or right headlights may be illuminating the wall above a permissible illumination level. The vehicle may further determine that the left headlight may be misaligned relative to the right headlight when a difference between the first and second illumination intensities may be greater than another threshold, indicating that the left zonal area may be getting more illuminated than the right zonal area or vice-versa. Responsive to such determination, the vehicle may perform horizontal pixel edge detection on the first and second sets of image pixels to determine whether a horizontal misalignment may exist between the left and right headlights.

Responsive to determining that the left and right headlights may be horizontally misaligned relative to each other, the vehicle may automatically adjust the headlight alignment, thereby rectifying the misalignment. In other aspects, the vehicle may output an alert notification, indicating to the vehicle mechanic or owner that there may be a horizontal misalignment between the left and right headlights. In this case, the vehicle mechanic or owner may take remedial actions responsive to hearing/viewing the alert notification.

The present disclosure discloses a vehicle that is configured to automatically determine whether the left and right vehicle headlights may be misaligned, and take timely remedial actions. Since the vehicle automatically determines the headlight misalignment, a probability of human-error in misalignment detection is considerably reduced. Further, the vehicle determines the headlight misalignment by using on-board vehicle camera, and hence does not require any external hardware. The vehicle is further configured to automatically adjust headlight alignment responsive to determining a misalignment, thereby significantly enhancing the convenience of vehicle mechanic or owner.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may be parked or be stationary in proximity to an external surface 104. The external surface 104 may be a wall or a door of a garage, a home or any other building, or may be any other surface that may be opaque and non-reflective. Hereinafter, in the present disclosure, the external surface 104 is referred to as wall 104.

In some aspects, the vehicle 102 may be located a predefined distance "D" away from the wall 104. The distance "D" may be in a range of 20 to 30 feet, and may be measured from a vehicle front tire 106 (or side mirrors) to the wall 104. The vehicle 102 may be located in proximity to the wall 104 such that the vehicle's front portion may face the wall 104. Specifically, the vehicle 102 may be located in proximity to the wall 104 such that a vehicle longitudinal axis (shown as vehicle longitudinal axis "L" in FIG. 4) may be perpendicular to the wall's plane, and vehicle's headlights (e.g., a left headlight 108*a* and a right headlight 108*b*) may face the wall 104, as shown in FIG. 1.

The vehicle 102 may take the form of any passenger or commercial vehicle such as a car, a work vehicle, a crossover vehicle, a truck, a van, a minivan, a taxi, a bus, etc. The vehicle 102 may be a manually driven vehicle, or may be configured to operate in a partially/fully autonomous mode, and may include any powertrain such as a gasoline engine, one or more electrically-actuated motor(s), a hybrid system, etc.

In some aspects, the vehicle 102 may be configured to determine if the left headlight 108*a* and/or the right headlight 108*b* may be misaligned or malfunctioning, and either automatically rectify the headlight misalignment or output an alert notification enabling a vehicle mechanic or owner to know that the headlights may be misaligned or malfunctioning. In the latter case, the vehicle mechanic or owner may get the headlights aligned/repaired, responsive to hearing/viewing the alert notification output by the vehicle 102.

A person ordinarily skilled in the art may appreciate that the vehicle headlights may be malfunctioning when one headlight may be getting illuminated more (or less) than the other headlight. Further, the vehicle headlights may be misaligned when the direction of illumination (e.g., direction of light beams emitted) from both the headlights may not be parallel, or when one headlight may be illuminating in a different direction than the other headlight. Furthermore, the vehicle headlights may be misaligned when one headlight may be illuminating a road in front of the vehicle 102 at a greater (or lesser) distance than the other headlight. As another example, the vehicle headlights may be misaligned when one or both the headlights may be projecting light beams above a first permissible height/level such that the light beams may glare incoming vehicles/traffic, or when one or both the headlights may be projecting light beams below a second permissible height/level such that the vehicle driver may not clearly view the road during nighttime. The examples of headlight misalignment or malfunctioning described above should not be construed as limiting, and other examples of headlight misalignment or malfunctioning are within the present disclosure scope.

Figure 2:
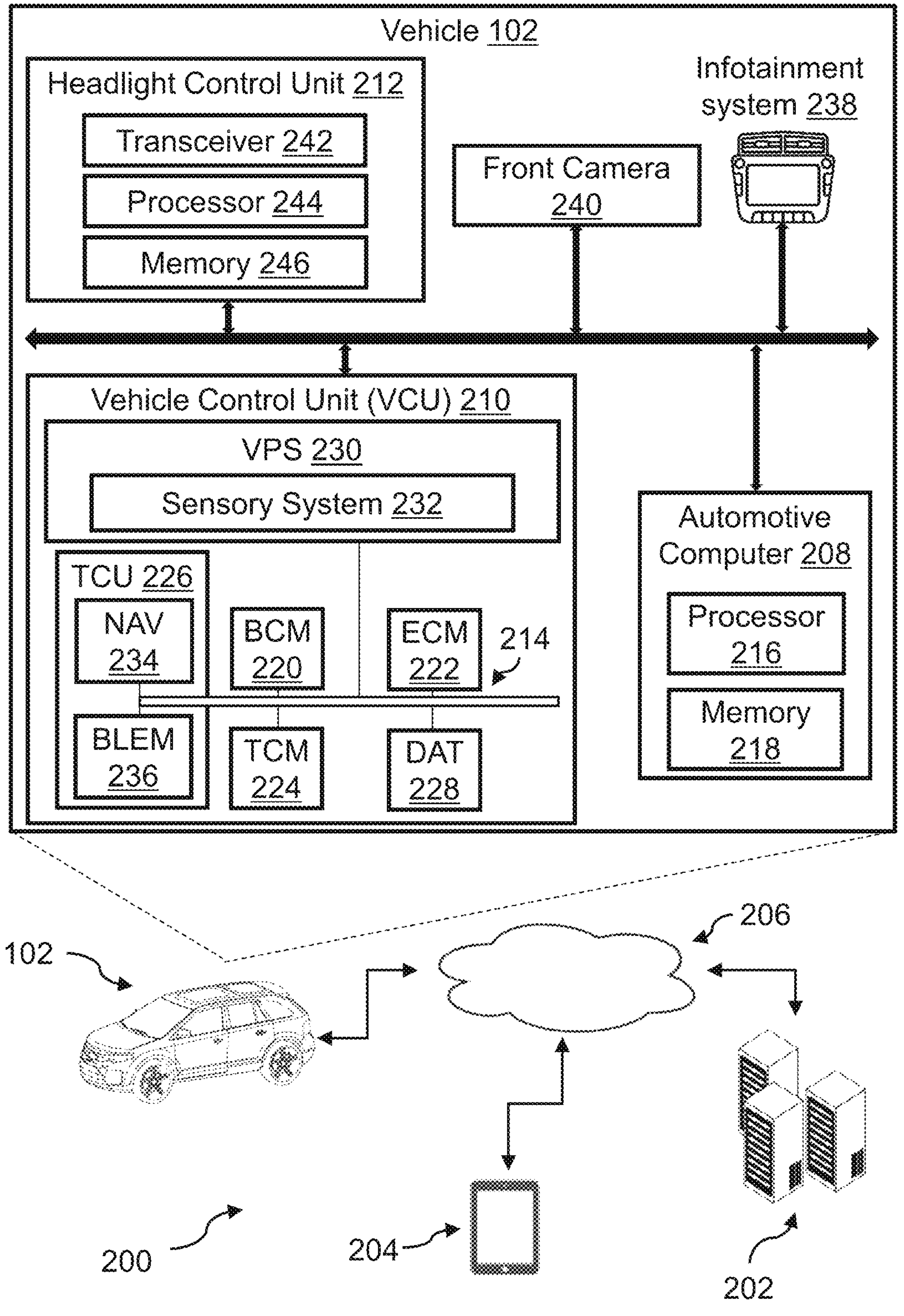
FIG. 2 depicts a block diagram of a system to align vehicle headlights in accordance with the present disclosure.

In some aspects, the vehicle 102 may determine if the left headlight 108*a* and/or the right headlight 108*b* may be misaligned or malfunctioning by performing dynamic headlight level sensing using images obtained from a vehicle front camera (shown as front camera 240 in FIG. 2). In a preferred aspect, the vehicle 102 may perform the headlight level sensing to determine headlight misalignment or malfunctioning when the ambient light may be dark (e.g., during nighttime) and no external light may be illuminating the wall 104.

In some aspects, the front camera may be configured to capture an image of a wall portion that may be within the camera's field of view (FOV), when the vehicle 102 may be located in front of the wall 104. In an exemplary aspect, the front camera may capture a first wall image when the left and right headlights 108*a*, 108*b* may be switched on or illuminated, and a second wall image when the left and right headlights 108*a*, 108*b* may be switched off.

A person ordinarily skilled in the art may appreciate that a predefined headlight zonal area 110 may get illuminated on the wall 104 when the left and right headlights 108*a*, 108*b* may be illuminated and the vehicle 102 may be located the distance "D" away from the wall 104. The position/dimensions of the predefined headlight zonal area 110 on the wall 104 (e.g., a distance of zonal area top and bottom edges from a wall bottom edge, a zonal area width, a zonal area length, etc.) may be based on the distance "D" and information/parameters associated with vehicle's design, structure, headlight calibration or mode (e.g., whether the headlights are being operated in high beam or low beam), etc. A person ordinarily skilled in the art may appreciate that if the left and right headlights 108*a*, 108*b* are not misaligned (i.e., operating optimally), the position/dimensions associated with the predefined headlight zonal area 110 may be fixed or same for all vehicles of same design and located at the same distance "D" from the wall 104. In some aspects, the predefined headlight zonal area 110 may include a predefined left zonal area 110*a* that may get illuminated by the left headlight 108*a* when the left headlight 108*a* may be switched on, and a predefined right zonal area 110*b* that may get illuminated by the right headlight 108*b* when the right headlight 108*b* may be switched on.

In some aspects, the vehicle 102 may obtain information associated with the position/dimensions of the predefined headlight zonal area 110 from an external server or a computing device associated with a vehicle mechanic or owner. In other aspects, the vehicle 102 may itself calculate the position/dimensions associated with the predefined headlight zonal area 110 based on the distance "D" and the information associated with the vehicle's design, structure, headlight calibration or mode, etc. In addition to obtaining (or calculating) the information associated with the position/dimensions of the predefined headlight zonal area 110, the vehicle 102 may obtain the first wall image and the second wall image from the front camera. The vehicle 102 may then perform Artificial Intelligence/Machine Learning (AI/ML) based image processing on the entire first wall image (i.e., on all image pixels associated with the first wall image) to determine a first ambient illumination intensity (in lux) associated with the wall 104 (specifically the wall portion in the front camera's FOV) when the headlights are switched on or illuminated. Similarly, the vehicle 102 may perform AI/ML based image processing on the entire second wall image (i.e., on all image pixels associated with the second wall image) to determine a second ambient illumination intensity (in lux) associated with the wall 104 (specifically the wall portion in the front camera's FOV) when the headlights are switched off.

In some aspects, since the front camera captures the second wall image when the left and right headlights 108*a*, 108*b* are switched off (and the vehicle 102 preferably performs the headlight level sensing during nighttime with no external lights), the second ambient illumination intensity may be close to zero. The vehicle 102 may output an error notification when the second ambient illumination intensity may not be close to zero, indicating to the vehicle mechanic or owner that the external lights should be switched off for the vehicle 102 to optimally perform the headlight level sensing. The vehicle 102 may further output the error notification when a first difference between the first and second ambient illumination intensities may be greater than a predefined first threshold (which may be in a range of 800 to 1,000 lux). The error notification may indicate to the vehicle mechanic or owner that the left and right headlights 108*a*, 108*b* may collectively be illuminating the wall 104 (or the wall portion in the front camera's FOV) beyond/above a permissible illumination level, and hence the left and/or right headlights 108*a*, 108*b* may be malfunctioning (or the vehicle 102 may located closer to the wall 104 than the prescribed distance "D"). The vehicle mechanic or owner may take remedial actions responsive to hearing/viewing the error notification.

A person ordinarily skilled in the art may appreciate from the description above that the first ambient illumination intensity may be indicative of an illumination level caused by the left and right headlights 108*a*, 108*b* "collectively" on the wall 104 (or the wall portion in the front camera's FOV). In addition to determining the illumination level caused by the left and right headlights 108*a*, 108*b* collectively, the vehicle 102 may be configured to determine illumination levels caused by the left and right headlights 108*a*, 108*b* "individually" on the wall 104, so that the vehicle 102 may determine the specific headlight (from the left and right headlights 108*a*, 108*b*) that may be misaligned or malfunctioning, as described below.

In some aspects, the vehicle 102 may be configured to dynamically map a first set of pixels (shown as first set of image pixels 402 in FIG. 4) in the first wall image and/or the second wall image to the left zonal area 110*a*, and a second set of pixels (shown as second set of image pixels 404 in FIG. 4) in the first wall image and/or the second wall image to the right zonal area 110*b* based on the distance "D" and/or the vehicle design information. Specifically, knowing the distance "D" between the front camera and the wall 104 (or the exact distance between the front camera and the wall 104 determined based on the distance "D" and vehicle's structural information), the vehicle 1012 may efficiently determine "portions" in the front camera's FOV that may correspond to the left and right zonal areas 110*a*, 110*b* on the wall 104. Responsive to determining the front camera FOV portions that may correspond to the left and right zonal areas 110*a*, 110*b*, the vehicle 102 may map sets of image pixels (e.g., the first and second sets of pixels, from all the pixels included in the first/second wall image) associated with the determined FOV portions with the left and right zonal areas 110*a*, 110*b*.

Responsive to mapping the first set of pixels to the left zonal area 110*a* and the second set of pixels to the right zonal area 110*b*, the vehicle 102 may perform AI/ML based image processing on the first set of pixels included in the first wall image to determine a first illumination intensity associated with the left zonal area 110*a* when the left and right headlights 108*a*, 108*b* may be switched on (or illuminated). Similarly, the vehicle 102 may perform AI/ML based image processing on the second set of pixels included in the first wall image to determine a second illumination intensity associated with the right zonal area 110*b* when the left and right headlights 108*a*, 108*b* may be switched on (or illuminated). The vehicle 102 may further perform AI/ML based image processing on the first set of pixels included in the second wall image to determine a third illumination intensity associated with the left zonal area 110*a* when the left and right headlights 108*a*, 108*b* may be switched off, and perform AI/ML based image processing on the second set of pixels included in the second wall image to determine a fourth illumination intensity associated with the right zonal area 110*b* when the left and right headlights 108*a*, 108*b* may be switched off.

The vehicle 102 may output an error notification when the third illumination intensity and/or the fourth illumination intensity may not be close to zero. The error notification may indicate to the vehicle mechanic or owner that an external light may be illuminating the left and/or right zonal areas 110*a*, 110*b*, and hence the external light should be switched off. The vehicle 102 may additionally output the error notification when a second difference between the first illumination intensity and the third illumination intensity associated with the left zonal area 110*a* may be greater than the predefined first threshold. This error notification may indicate to the vehicle mechanic or owner that the left headlight 108*a* may be illuminating the left zonal area 110*a* more than the permissible level, and hence the left headlight 108*a* may be malfunctioning (or the vehicle 102 may be located closer to the wall 104 than the prescribed distance "D"). The vehicle 102 may perform similar test for the right headlight 108*b* and the right zonal area 110*b*. Specifically, the vehicle 102 may output the error notification when a third difference between the second illumination intensity and the fourth illumination intensity associated with the right zonal area 110*b* may be greater than the predefined first threshold, indicating that the right headlight 108*b* may be illuminating the right zonal area 110*b* more than the permissible level.

In further aspects, the vehicle 102 may determine a fourth difference between the second difference and the third difference described above. Since the third illumination intensity and the fourth illumination intensity are expected to be close to zero (since the vehicle 102 preferably performs the headlight level sensing during nighttime with no external lights), the fourth difference may be equivalent to a difference (e.g., a fifth difference) between the first illumination intensity and the second illumination intensity. Stated another way, the fourth or fifth difference described above may be equivalent to a difference between the illumination levels associated with the left zonal area 110*a* and the right zonal area 110*b*.

The vehicle 102 may output another alert or error notification when the fourth or fifth difference described above may be greater than a second threshold (which may be same as or different from the first threshold described above). Stated another way, the vehicle 102 may output the alert notification when the left zonal area 110*a* may be illuminated by the left headlight 108*a* at an illumination intensity that may be substantially greater (or lower) than an illumination intensity at which the right zonal area 110*b* may be getting illuminated by the right headlight 108*b*. The alert notification may indicate to the vehicle mechanic or owner that the left headlight 108*a* may be misaligned relative to the right headlight 108*b*.

In this case, the vehicle 102 may additionally or alternatively determine a presence of a horizontal headlight misalignment between the left headlight 108*a* and the right headlight 108*b* based on the first wall image (i.e., the image captured by the front camera when the left and right headlights 108*a*, 108*b* are illuminated), and automatically correct the horizontal misalignment (or inform the vehicle mechanic or owner about the horizontal misalignment). The process of determining the presence of horizontal headlight misalignment is described in detail later in the description below in conjunction with FIG. 2.

The vehicle 102 and/or the vehicle mechanic/owner implement and/or perform operations, as described here in the present disclosure, in accordance with the owner manual and safety guidelines. In addition, any action taken by the vehicle mechanic/owner based on notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

FIG. 2 depicts a block diagram of a system 200 to align vehicle headlights in accordance with the present disclosure. While describing FIG. 2, references will be made to FIGS. 3, 4, 5 and 6.

The system 200 may include the vehicle 102, one or more servers 202 (or a server 202), and a user device 204 communicatively coupled with each other via one or more networks 206. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 202 may provide AI/ML based image processing algorithms to the vehicle 102, which may enable the vehicle 102 to analyze the first and second wall images and determine the illumination intensities described above. Specifically, the AI/ML based image processing algorithms may enable the vehicle 102 to perform pixel level analysis on the image(s) captured by the vehicle front camera, and determine illumination intensities associated with the entire image and/or specific image portions based on the pixel level analysis. The AI/ML based image processing algorithms may further enable the vehicle 102 to determine distribution of illuminated pixels within the image captured by the front camera based on the pixel level analysis. The server 202 may provide the AI/ML based image processing algorithms to the vehicle 102 at a predefined frequency, or when the vehicle 102 transmits a request to the server 202 to obtain such algorithms.

The user device 204 may be associated with the vehicle mechanic or owner, and may be, for example, a mobile phone, a computer, a laptop, a tablet, a smart wearable device, or any other device with communication capabilities.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a headlight control unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor (s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor (s) 216 may utilize the memory 218 to store programs in code and/or to store data for performing aspects in accordance with the disclosure. The memory 218 may be a non-transitory computer-readable medium or memory storing a headlight control program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 202), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (radar) sensor configured for detection and localization of objects inside and outside the vehicle 102 using radio waves, sitting area buckle sensors, sitting area sensors, a Light Detecting and Ranging (lidar) sensor, door sensors, proximity sensors, temperature sensors, wheel sensors, ambient weather sensors, vehicle internal and external cameras (including the vehicle front camera described above), one or more rain sensors, capacitive moisture sensors, etc.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob, not shown in FIG. 2), computers, and modules. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, and various comfort controls. The BCM 220 may also operate as a gateway for bus and network interfaces to interact with remote ECUs (not shown in FIG. 2). In some aspects, the BCM 220 may be configured to adjust the alignment of the left headlight 108*a* and/or the right headlight 108*b* based on command signals obtained from the processor 116, the unit 212, the user device 204 and/or the server 202. For example, the BCM 220 may move the left headlight 108*a* and/or the right headlight 108*b* up or down based on the obtained command signals.

The DAT controller 228 may provide Level-1 through Level-3 automated driving and driver assistance functionality that may include, for example, active parking assistance, vehicle backup assistance, adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions via the touchscreen interface portion, and/or display notifications, navigation maps, etc. on the touchscreen interface portion.

As described above, the vehicle 102 may further include a front camera 240 that may be configured to capture an image of the wall 104 (or a wall portion in the camera's FOV). The front camera 240 may be associated with the vehicle sensory system 232, or may be a separate unit within the vehicle 102.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 242, a processor 244, and a computer-readable memory 246.

The transceiver 242 may be configured to receive information/inputs from one or more external devices or systems, e.g., the user device 204, the server(s) 202, and/or the like via the network 206. For example, the transceiver 242 may receive the AI/ML based image processing algorithms from the server(s) 202 via the network 206. Further, the transceiver 242 may transmit notifications (e.g., alert/alarm signals) to the external devices or systems. In addition, the transceiver 242 may be configured to receive information/inputs from vehicle 102 components such as the infotainment system 238, the vehicle sensory system 232, the front camera 240, and/or the like. Further, the transceiver 242 may transmit notifications (e.g., alert/alarm/command signals) to the vehicle 102 components such as the infotainment system 238, the BCM 220, etc.

The processor 244 and the memory 246 may be the same as or similar to the processor 216 and the memory 218, respectively. In some aspects, the processor 244 may be an AI/ML based processor that may utilize the memory 246 to store programs in code and/or to store data for performing aspects in accordance with the disclosure. The memory 246 may be a non-transitory computer-readable medium or memory storing the headlight control code. In some aspects, the memory 246 may additionally store the AI/ML based image processing algorithms that the vehicle 102 may obtain from the server(s) 202. The memory 246 may further store the information associated with vehicle's structure, design, model, and/or the like. The memory 246 may additionally store the information associated with the position/dimensions of the predefined headlight zonal area 110 obtained from the server(s) 202 or a computing device associated with the vehicle mechanic or owner, as described above in conjunction with FIG. 1.

Figure 4:
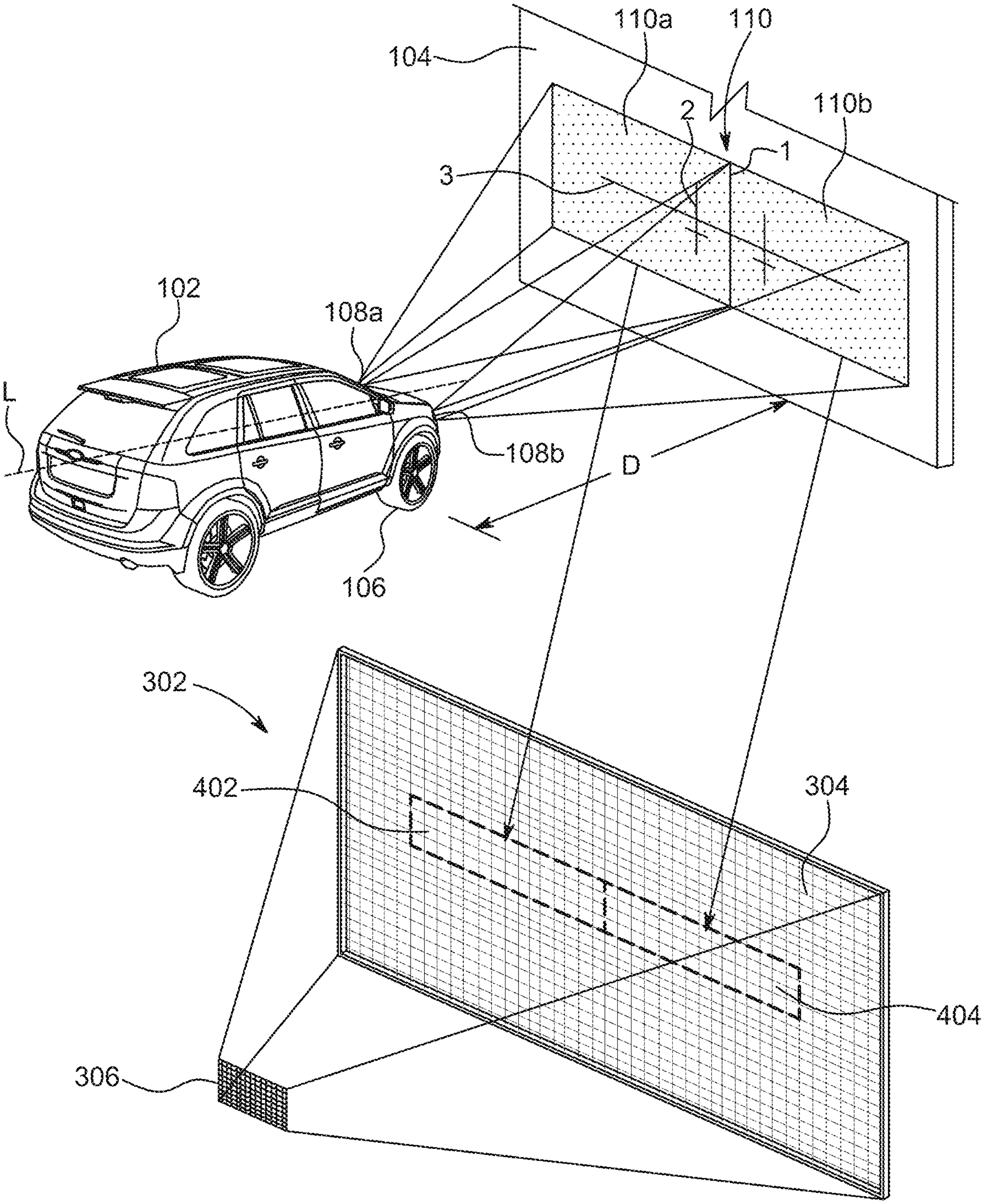
FIG. 4 depicts a snapshot illustrating a mapping of a predefined area of an external surface with a set of image pixels in accordance with the present disclosure.

In operation, when the vehicle mechanic or owner desires the vehicle 102 to perform the headlight level sensing to determine headlight misalignment, the vehicle mechanic or owner may park the vehicle 102 in front of the wall 104 when the ambient light may be dark (and no external lights may be illuminated), as described above in conjunction with FIG. 1. An example view of the vehicle 102 parked in front of the wall 104 is shown in FIG. 4. As depicted in FIG. 4 and described above, the vehicle 102 may be stationed at the predefined distance "D" away from the wall 104, and a vehicle longitudinal axis "L" may be perpendicular to the wall plane. Further, the left and right headlights 108*a*, 108*b* may face the wall 104.

As described above in conjunction with FIG. 1, the predefined headlight zonal area 110 may get illuminated on the wall 104 when the left and right headlights 108*a*, 108*b* may be illuminated and the vehicle 102 may be located the predefined distance "D" away from the wall 104. In an exemplary aspect, the predefined headlight zonal area 110 may be aligned with the left and right headlights 108*a*, 108*b* such that a vehicle vertical center guideline "1" may be at a center of the headlight zonal area 110 (as shown in FIG. 4), and a mid-point of the headlight zonal area 110 may coincide with an intersection point of the vehicle vertical center guideline "1" and a horizontal headlight cutoff line "3". Further, one vertical headlight axis line "2" may be situated in the left zonal area 110*a* (associated with the left headlight 108*a*) and a second vertical headlight axis line "2" may be situated in the right zonal area 110*b* (associated with the right headlight 108*b*), as shown in FIG. 4. As described above, the left headlight 108*a* may illuminate the left zonal area 110*a*, and the right headlight 108*b* may illuminate the right zonal area 110*b*, when the left and right headlights 108*a*, 108*b* may be illuminated.

As described above in conjunction with FIG. 1, in some aspects, the vehicle 102 (specifically the processor 244) may obtain the information associated with the position/dimensions of the predefined headlight zonal area 110 on the wall 104 from the server(s) 202 or a computing device associated with the vehicle mechanic or owner. In other aspects, the processor 244 may itself calculate the position/dimensions associated with the predefined headlight zonal area 110 based on the distance "D" and the information associated with vehicle's design, structure, headlight calibration or mode, etc.

Figure 3:
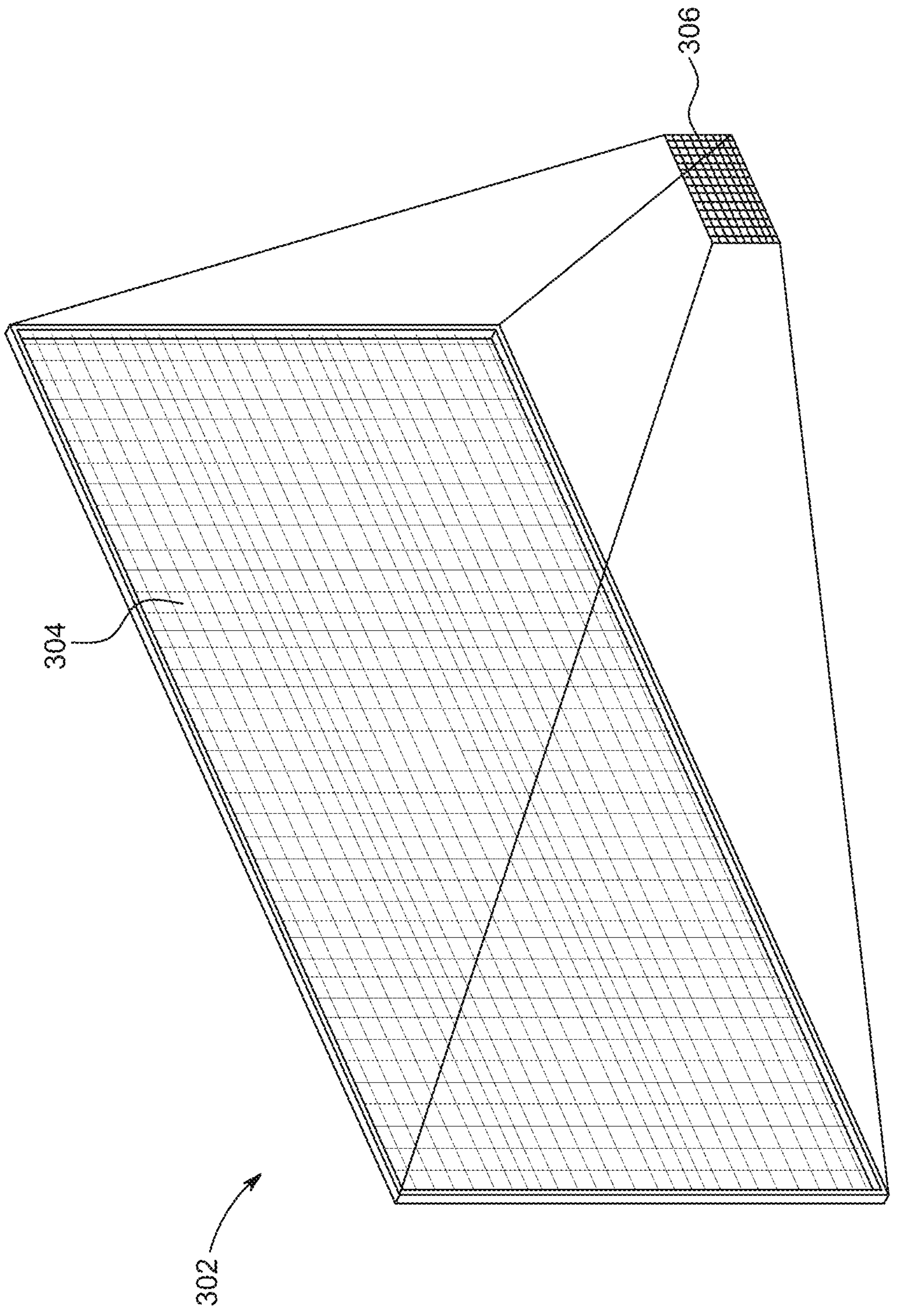
FIG. 3 depicts an image including a plurality of pixels captured by a vehicle camera in accordance with the present disclosure.

When the vehicle 102 may be parked the distance "D" away from the wall 104, the front camera 240 may capture a wall image when the left and right headlights 108*a*, 108*b* may be illuminated (i.e., the first wall image, as described above), and another wall image when the left and right headlights 108*a*, 108*b* may be switched off (i.e., the second wall image). In some aspects, an image 302 captured by the front camera 240 may include a plurality of pixels 304, as shown in FIG. 3. A person ordinarily skilled in the art may appreciate that the front camera 240 may capture image of that wall portion that may be in the front camera's FOV (specifically, an FOV of a camera lens 306). Further, the plurality of pixels 304 may be in the form of a grid or a matrix (e.g., a matrix of predefined counts of pixel rows and pixel columns, which may depend on a camera type, resolution, etc.).

In some aspects, the processor 244 may automatically cause the left and right headlights 108*a*, 108*b* to switch off (e.g., by transmitting command signals to the BCM 220) when the vehicle 102 may be parked at the distance "D" away from the wall 104, so that the front camera 240 may capture the second wall image. Responsive to the front camera 240 capturing the second wall image, the processor 244 may cause the left and right headlights 108*a*, 108*b* to switch on, so that the front camera 240 may capture the first wall image. In other aspects, the switching on and off of the left and right headlights 108*a*, 108*b* may be manually performed by the vehicle mechanic or owner.

Responsive to the front camera 240 capturing the first wall image and the second wall image, the processor 244 may obtain the first wall image and the second wall image from the front camera 240. The processor 244 may further determine (or obtain from the VCU 210 or directly from the front camera 240) one or more front camera characteristics including, but not limited to, a front camera exposure time, a front camera gain, and/or the like. The processor 244 may then execute the AL/ML based image processing algorithms obtained from the server(s) 202 on the plurality of pixels 304 associated with the first wall image (i.e., the entire first wall image) to determine the first ambient illumination intensity associated with the wall portion in the front camera's FOV based on the front camera characteristics. Similarly, the processor 244 may execute the AL/ML based image processing algorithms on the plurality of pixels 304 associated with the second wall image (i.e., the entire second wall image) to determine the second ambient illumination intensity associated with the wall portion in the front camera's FOV based on the front camera characteristics. As described above, the first ambient illumination intensity may be indicative of an illumination intensity on the wall 104 when the left and right headlights 108*a*, 108*b* may be switched on, and the second ambient illumination intensity may be indicative of an illumination intensity on the wall 104 when the left and right headlights 108*a*, 108*b* may be switched off.

As described above, since the vehicle 102 performs the headlight level sensing preferably when the ambient light is dark with no external lights illuminated, the second ambient illumination intensity may be close to zero. The processor 244 may be configured to output a first error notification when the second ambient illumination intensity may not be close to zero (or greater than a predefined ambient light threshold), indicating to the vehicle mechanic or owner that the external lights should be switched off for the vehicle 102 to optimally perform the headlight level sensing. The processor 244 may output the first error notification (and additional notifications described below) via the infotainment system 238 and/or the user device 204.

Furthermore, as described above in conjunction with FIG. 1, the processor 244 may determine the first difference between the first and second ambient illumination intensities, and may output a second error notification when the first difference may be greater than the predefined first threshold. The second error notification may indicate to the vehicle mechanic or owner that the left and right headlights 108*a*, 108*b* may collectively be illuminating the wall portion in the front camera's FOV beyond/above a permissible illumination level, and hence the left and/or right headlights 108*a*, 108*b* may be malfunctioning (or the vehicle 102 may located closer to the wall 104 than the prescribed distance "D"). The vehicle mechanic or owner may take remedial actions responsive to hearing/viewing the first and/or second error notifications.

On the other hand, when the second ambient illumination intensity may not be greater than the ambient light threshold and the first difference may be less than the predefined first threshold, the processor 244 may map a first set of image pixels 402, from the plurality of pixels 304, to the left zonal area 110*a* based on the distance "D" and the vehicle design or structural information (that may be pre-stored in the memory 246), as described above in conjunction with FIG. 1. Similarly, the processor 244 may map a second set of image pixels 404, from the plurality of pixels 304, to the right zonal area 110*b* based on the distance "D" and the vehicle design or structural information.

Responsive to mapping the first set of image pixels 402 to the left zonal area 110*a*, the processor 244 may execute the AL/ML based image processing algorithms on the first set of image pixels 402 in the first wall image (or a first wall image portion associated with the first set of image pixels 402) to determine the first illumination intensity associated with the left zonal area 110*a* based on the front camera characteristics. The processor 244 may similarly execute the AL/ML based image processing algorithms on the second set of image pixels 404 in the first wall image (or a first wall image portion associated with the second set of image pixels 404) to determine the second illumination intensity associated with the right zonal area 110*b* based on the front camera characteristics, as described above in conjunction with FIG. 1. Furthermore, the processor 244 the processor 244 may execute the AL/ML based image processing algorithms on the first set of image pixels 402 and the second set of image pixels 404 in the second wall image based on the front camera characteristics to determine the third and fourth illumination intensities, respectively. As described above, the first and second illumination intensities are associated with the first wall image, i.e., the wall image captured by the front camera 240 when the left and right headlights 108*a*, 108*b* are illuminated. Further, the third and fourth illumination intensities are associated with the second wall image, i.e., the wall image captured by the front camera 240 when the left and right headlights 108*a*, 108*b* are switched off.

Since the third and fourth illumination intensities are associated with the scenario when the left and right headlights 108*a*, 108*b* are switched off, the third and fourth illumination intensities are expected to be close to zero. The processor 244 may output the first error notification when the third illumination intensity and/or the fourth illumination intensity may not be close to zero (or greater than the predefined ambient light threshold), indicating to the vehicle mechanic or owner that external lights may be illuminating either the left or right zonal areas 110*a*, 110*b*, and hence the external light should be switched off.

The processor 244 may further calculate the second difference between the first illumination intensity and the third illumination intensity, and the third difference between the second illumination intensity and the fourth illumination intensity, as described above in conjunction with FIG. 1. Since the third and fourth illumination intensities are expected to be close to zero, the second difference may be equivalent to the first illumination intensity, and the third difference may be equivalent to the second illumination intensity.

The processor 244 may output an error notification (e.g., the second error notification described above) when the second difference or the third difference may be greater than the predefined first threshold. This error notification may indicate to the vehicle mechanic or owner that left headlight 108*a* may be illuminating the left zonal area 110*a* more than the permissible illumination level or the right headlight 108*b* may be illuminating the right zonal area 110*b* more than the permissible illumination level. The vehicle mechanic or owner may take remedial actions responsive to hearing/viewing this error notification.

In further aspects, each of the second difference (or the first illumination intensity) and the third difference (or the second illumination intensity) is expected to be equivalent to half of the first difference (or the first ambient illumination intensity), since the left zonal area 110*a* and the right zonal area 110*b* are each expected to be half of the headlight zonal area 110 and should get equally illuminated by respective headlights if the headlights are properly aligned. The processor 244 may output yet another error notification or alert notification when the second difference (or the first illumination intensity) or the third difference (or the second illumination intensity) is not half of the first difference (or the first ambient illumination intensity), indicating to the vehicle mechanic or owner that the left zonal area 110*a* may be getting more (or less) illuminated than the right zonal area 110*b*, which may be due to misaligned headlights.

Furthermore, the processor 244 may perform a predefined action when the fourth difference between the second difference and the third difference, or the fifth difference between the first illumination intensity and the second illumination intensity may be greater than the predefined second threshold (which may be same as or different from the first threshold described above). Since the third illumination intensity and the fourth illumination intensity are expected to be close to zero (since the vehicle 102 preferably performs the headlight level sensing during nighttime with no external lights), the fourth difference may be equivalent to the fifth difference, as described above.

In one exemplary aspect, the processor 244 may perform the predefined action by outputting an alert notification on the infotainment system 238 and/or the user device 204, indicating to the vehicle mechanic or owner that the headlights may be misaligned, and hence the vehicle mechanic or owner should get the headlights aligned. In a second exemplary aspect, the processor 244 may perform the predefined action by determining a presence of a horizontal headlight misalignment between the left headlight 108*a* and the right headlight 108*b* based on the first wall image (i.e., the image captured by the front camera 240 when the left and right headlights 108*a*, 108*b* are illuminated), and automatically correcting the horizontal misalignment (or informing the vehicle mechanic or owner about the horizontal misalignment), as described below.

Figure 5:
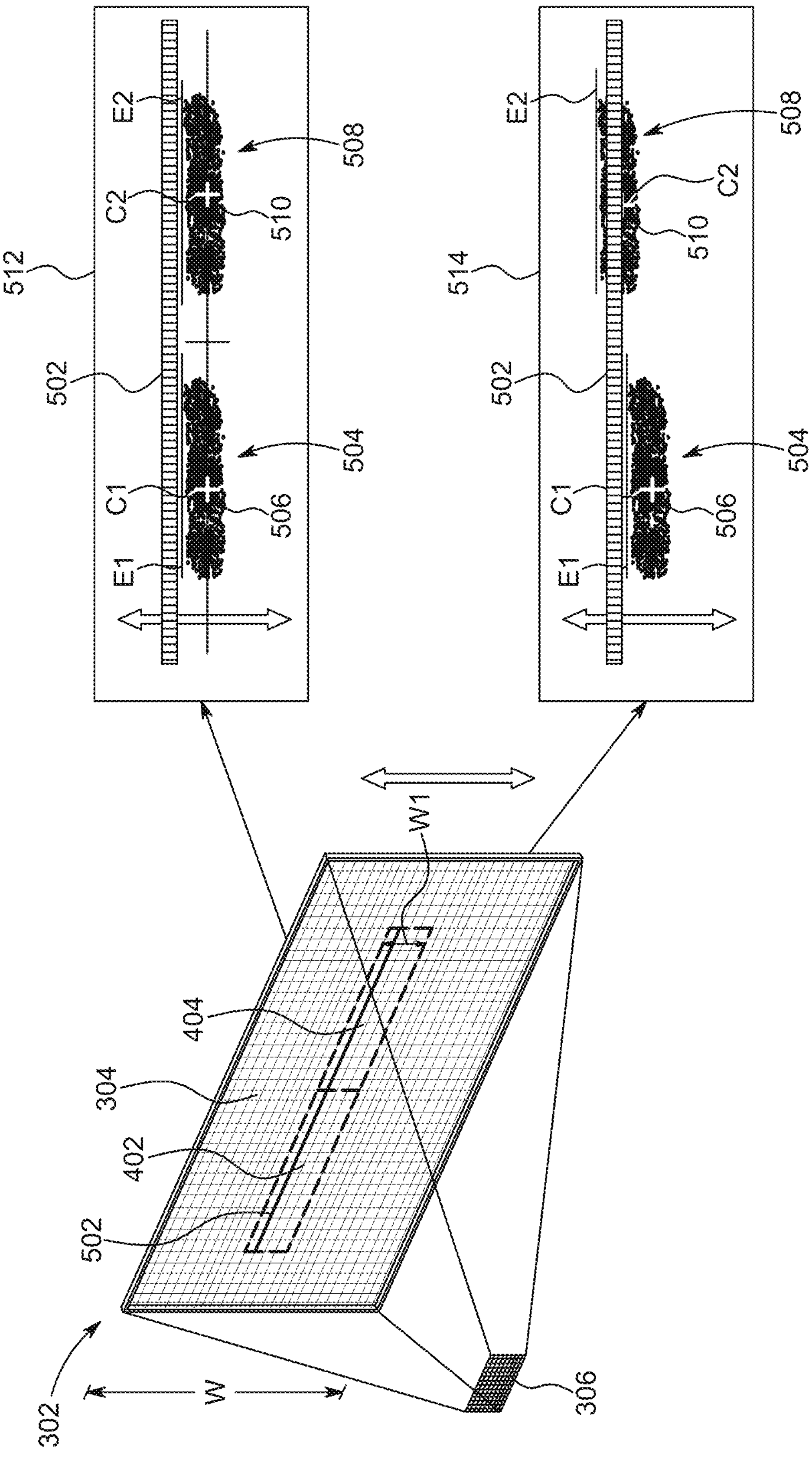
FIG. 5 depicts example snapshots of pixel distribution on an image in accordance with the present disclosure.

In some aspects, the plurality of pixels 304 associated with the image 302 (e.g., the first wall image) captured by the front camera 240 may include a plurality of pixel rows stacked one over another along an image width "W", as shown in FIG. 5. Similarly, the first set of image pixels 402 may include a first plurality of pixel rows stacked one over another, and the second set of image pixels 404 may include a second plurality of pixel rows stacked one over another along a width "W1" of the first and second set of image pixels 402, 404.

Responsive to determining that the fourth difference or the fifth difference may be greater than the predefined second threshold, the processor 244 may execute the AI/ML based image processing algorithms to perform pixel analysis of each pixel row associated with the first plurality of pixel rows and the second plurality of pixel rows along the width "W1". Specifically, in this case, the processor 244 may cause a horizontal pixel edge detector 502 (as shown in FIG. 5) to sweep and scan each pixel row associated with the first and second pluralities of pixel rows a predefined count of times (or multiple times) to perform the pixel analysis of each row and determine/evaluate pixels with symmetrical light intensity or out-of-layer light intensity.

Responsive to performing the pixel analysis of each pixel row as described above, the processor 244 may determine/generate a first distribution 504 associated with a plurality of first illuminated pixels 506 from the first set of image pixels 402, and a second distribution 508 associated with a plurality of second illuminated pixels 510 from the second set of image pixels 404 based on the pixel analysis. The first illuminated pixels 506 may be those pixels from the first set of pixels 402 that may be illuminated by the left headlight 108*a*, and the second illuminated pixels 510 may be those pixels from the second set of pixels 404 that may be illuminated by the right headlight 108*b*. Examples of the first and second distributions 504, 508 are depicted in views 512 and 514 of FIG. 5.

Responsive to determining/generating the first and second distributions 504, 508, the processor 244 may determine a first center "C1" and/or a first top edge "E1" associated with the first distribution 504, and a second center "C2" and/or a second top edge "E2" associated with the second distribution 508. The processor 244 may determine that the first and second distributions 504, 508 may be horizontally aligned with each other when the first center "C1" may be aligned with the second center "C2", and/or the first top edge "E1" may be aligned with the second top edge "E2", as shown in the view 514. In this case, the processor 244 may determine that the left headlight 108*a* may be aligned with the right headlight 108*b*.

On the other hand, the processor 244 may determine that the first distribution 504 may not be aligned with the second distribution 508 when the first center "C1" may not be horizontally aligned with the second center "C2", and/or the first top edge "E1" may not be horizontally aligned with the second top edge "E2", as shown in the view 512. In the example view 512, the second distribution 508 is shown to be aligned upwards relative to the first distribution 504. In this case, the processor 244 may determine that the left headlight 108*a* may not be aligned with the right headlight 108*b*. Specifically, in this case, the processor 244 may determine that the right headlight 108*b* may be illuminating an area/section on the wall 104 that may be slightly higher than a corresponding area/section on the wall 104 illuminated by the left headlight 108*a*.

Responsive to determining that the first distribution 504 may not be aligned with the second distribution 508, the processor 244 may transmit a command signal to the BCM 220 to automatically adjust alignment of the left headlight 108*a* and/or the right headlight 108*b* such that the first distribution 504 may get horizontally aligned with the second distribution 508. In alternative aspects, responsive to determining that the first distribution 504 may not be aligned with the second distribution 508, the processor 244 may output an alert notification, indicating to the vehicle mechanic or owner that there may be horizontal misalignment between the left and right headlights 108*a*, 108*b*. The vehicle mechanic or owner may take remedial actions responsive to hearing/viewing the alert notification.

Figure 6:
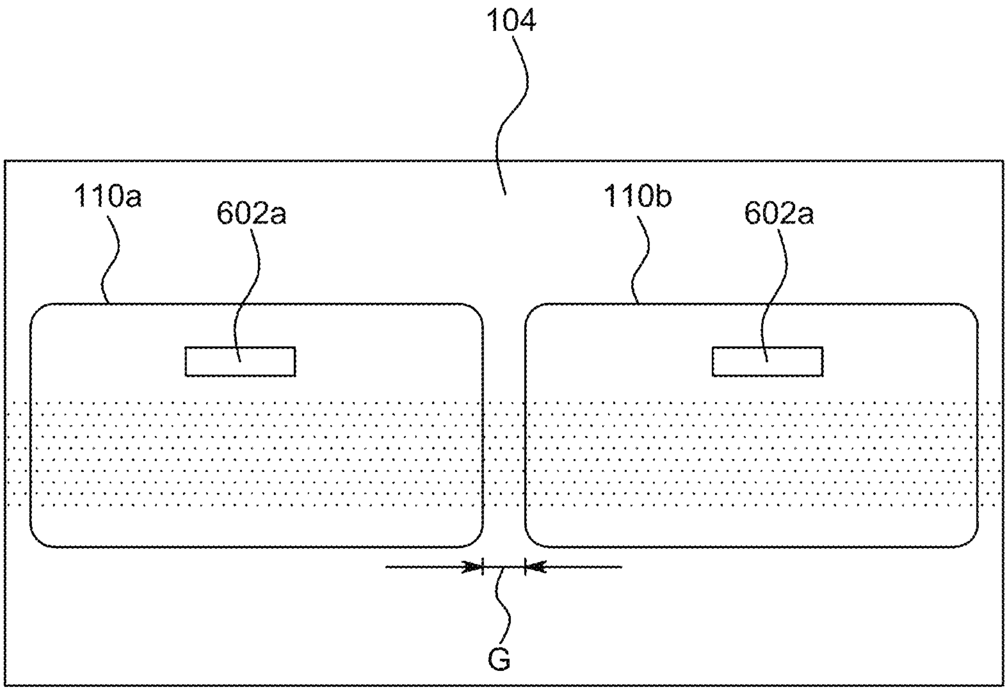
FIG. 6 depicts a snapshot of an example external surface including two illuminated sections in accordance with the present disclosure.

In further aspects, the processor 244 may be configured to determine that the first top edge "E1" and/or the second top edge "E2" may be above a predefined edge line associated with the image 302. The predefined edge line may be associated with one or more markers 602*a*, 602*b* (as shown in FIG. 6) that may be disposed on the left zonal area 110*a* and the right zonal area 110*b* on the wall 104, indicating a permissible height level up to which the left and right headlights 108*a*, 108*b* may project light beams (either in low beam or high beam mode of headlight operation). The markers 602*a*, 602*b* may be disposed on the wall 104 by the vehicle mechanic or owner, and the processor 244 may determine the predefined edge line in the image 302 that may correspond to the positions of the markers 602*a*, 602*b* on the wall 104 by executing the AI/ML based image processing algorithms on the image 302.

Responsive to determining that the first top edge "E1" and/or the second top edge "E2" may be above the predefined edge line, the processor 244 may automatically adjust the alignment of the left headlight 108*a* and/or the right headlight 108*b* to move the first top edge "E1" and/or the second top edge "E2" below the predefined edge line. In alternative aspects, the processor 244 may output an alert notification for the vehicle mechanic or owner, responsive to the determination described above.

In some aspects, the left zonal area 110*a* and the right zonal area 110*b* may be of different shapes, e.g., rectangular, elliptical, oval, etc. Further, in some aspects, the left zonal area 110*a* and the right zonal area 110*b* may be disposed adjacent to each other, and may share a command edge along a zonal area width, as shown in FIGS. 1, 4 and 5. In other aspects, a predefined gap "G" (as shown in FIG. 6) may exist between the left zonal area 110*a* and the right zonal area 110*b*. While performing the headlight level sensing described above, the processor 244 may not calculate or ignore the illumination intensity associated with the predefined gap "G" (or "disabled zone").

Although the description above describes an aspect where the vehicle 102 performs the headlight level sensing when the vehicle 102 is stationary in front of the wall 104, the present disclosure is not limited to such an aspect. In some aspects, the vehicle 102 may also perform the headlight level sensing in the same manner as described above when the vehicle 102 may be in motion on a flat road and at nighttime with no disturbance from incoming traffic, or streetlight. In this case, the processor 244 may estimate the natural ambient light intensity from learned history or cloud data. The remaining steps required to perform the headlight level sensing in this case may be same as the steps described above.

Further, the process of headlight level sensing to determine headlight misalignment, as described in the present disclosure, may also be implemented during end-of-line light calibration of the vehicle 102. In this case, the mechanic may implement the process described above, and automate the process based on a predefined setting and light intensity (at a controlled location in the plant) at the end of the line. In this manner, the present disclosure may enable the end-of-line light calibration process to become more efficient and accurate (by considerably reducing probability of any human error).

Figure 7:
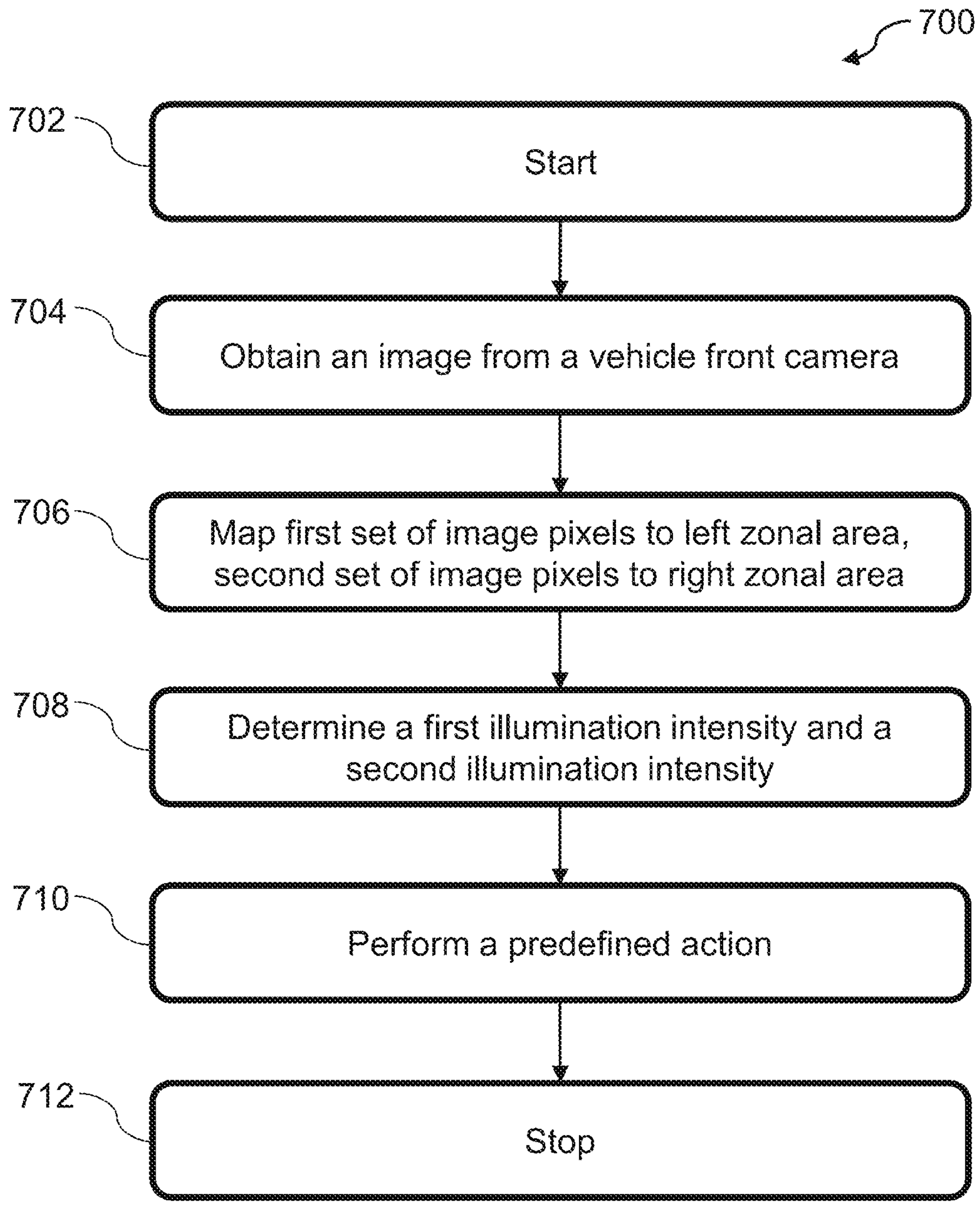
FIG. 7 depicts a flow diagram of a method to align vehicle headlights in accordance with the present disclosure.

FIG. 7 depicts a flow diagram of a method 700 to align vehicle headlights in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 700 starts at step 702. At step 704, the method 700 may include obtaining, by the processor 244, the image (e.g., the first wall image) from the front camera 240. At step 706, the method 700 may include mapping, by the processor 244, the first set of pixels 402 to the left zonal area 110*a*, and the second set of pixels 404 to the right zonal area 110*b*, as described above.

At step 708, the method 700 may include determining, by the processor 244, the first illumination intensity associated with the left zonal area 110*a* based on the first set of pixels 402, and the second illumination intensity associated with the right zonal area 110*b* based on the second set of pixels 404. At step 710, the method 700 may include performing, by the processor 244, the predefined action when the difference between the first illumination intensity and the second illumination intensity may be greater than a threshold. Examples of the predefined action are described above in conjunction with FIG. 2.

The method 700 may end at step 712.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a front camera configured to capture an image of an external surface in front of the vehicle, wherein the vehicle is located at a distance away from the external surface;

a left headlight configured to illuminate a left zonal area of the external surface when the left headlight is illuminated, and a right headlight configured to illuminate a right zonal area of the external surface when the right headlight is illuminated; and a processor configured to:

obtain the image from the front camera;

map a first set of image pixels of the image to the left zonal area and a second set of image pixels of the image to the right zonal area based on the distance;

determine a first illumination intensity associated with the left zonal area based on the first set of image pixels and a second illumination intensity associated with the right zonal area based on the second set of image pixels, when the left headlight and the right headlight are illuminated; and perform a predefined action when a first difference between the first illumination intensity and the second illumination intensity is greater than a first threshold; and cause the left headlight and the right headlight to switch off when the vehicle is located the distance away from the external surface.

2. The vehicle of claim 1, wherein the processor is further configured to:

determine a front camera characteristic; and determine the first illumination intensity and the second illumination intensity based on the front camera characteristic.

3. The vehicle of claim 2, wherein the front camera characteristic comprises at least one of a front camera exposure time or a front camera gain.

4. The vehicle of claim 1, wherein the predefined action comprises automatically adjusting an alignment of at least one of the left headlight or the right headlight.

5. The vehicle of claim 4, wherein the first set of image pixels comprises a first plurality of pixel rows stacked one over another, and the second set of image pixels comprises a second plurality of pixel rows stacked one over another, and wherein the processor is further configured to:

perform a pixel analysis of each row of the first plurality of pixel rows and the second plurality of pixel rows, responsive to determining that the first difference is greater than the first threshold;

determine a first distribution associated with a plurality of first illuminated pixels from the first set of image pixels and a second distribution associated with a plurality of second illuminated pixels from the second set of image pixels based on the pixel analysis;

determine that the first distribution is not horizontally aligned with the second distribution; and automatically adjust the alignment of at least one of the left headlight or the right headlight to horizontally align the first distribution with the second distribution, responsive to determining that the first distribution is not horizontally aligned with the second distribution.

6. The vehicle of claim 5, wherein the processor is further configured to:

determine a first top edge associated with the first distribution and a second top edge associated with the second distribution; and determine that the first distribution is not horizontally aligned with the second distribution when the first top edge is not aligned with the second top edge.

7. The vehicle of claim 6, wherein the processor is further configured to:

determine that at least one of the first top edge or the second top edge is above an edge line associated with the image; and automatically adjust the alignment of at least one of the left headlight or the right headlight to move the at least one of the first top edge or the second top edge below the edge line.

8. The vehicle of claim 1, wherein the predefined action comprises outputting an alert notification via a vehicle human-machine interface (HMI) or a user device.

9. The vehicle of claim 1, wherein the processor is further configured to determine a first ambient illumination intensity based on all image pixels associated with the image, when the left headlight and the right headlight are illuminated.

10. The vehicle of claim 9, wherein the processor is further configured to:

cause the left headlight and the right headlight to switch off when the vehicle is located the distance away from the external surface;

determine a second ambient illumination intensity based on all image pixels associated with the image when the left headlight and the right headlight are switched off; and determine a third illumination intensity associated with the left zonal area based on the first set of image pixels and a fourth illumination intensity associated with the right zonal area based on the second set of image pixels, when the left headlight and the right headlight are switched off.

11. The vehicle of claim 10, wherein the processor is further configured to output a first error notification when at least one of the second ambient illumination intensity, the third illumination intensity or the fourth illumination intensity is greater than a second threshold.

12. The vehicle of claim 10, wherein the processor is further configured to:

calculate a second difference between the first ambient illumination intensity and the second ambient illumination intensity; and output a second error notification when the second difference is greater than a third threshold.

13. The vehicle of claim 12, wherein the processor is further configured to:

calculate a third difference between the first illumination intensity and the third illumination intensity, and a fourth difference between the second illumination intensity and the fourth illumination intensity; and output the second error notification when at least one of the third difference or the fourth difference is greater than the third threshold.

14. The vehicle of claim 13, wherein the processor is further configured to perform the predefined action when a fifth difference between the third difference and the fourth difference is greater than the first threshold.

15. The vehicle of claim 1, wherein the processor is further configured to map the first set of image pixels with the left zonal area and the second set of image pixels with the right zonal area based on vehicle design information.

16. A method for aligning vehicle headlights, the method comprising:

obtaining, by a processor, an image from a front camera associated with a vehicle, wherein the front camera is configured to capture the image of an external surface in front of the vehicle, and wherein the vehicle is located a distance away from the external surface;

mapping, by the processor, a first set of image pixels of the image to a left zonal area of the external surface and a second set of image pixels of the image to a right zonal area of the external surface based on the distance, wherein the left zonal area is configured to be illuminated by a left headlight when the left headlight is illuminated, and wherein the right zonal area is configured to be illuminated by a right headlight when the right headlight is illuminated;

determining, by the processor, a first illumination intensity associated with the left zonal area based on the first set of image pixels and a second illumination intensity associated with the right zonal area based on the second set of image pixels, when the left headlight and the right headlight are illuminated; and performing, by the processor, a predefined action when a difference between the first illumination intensity and the second illumination intensity is greater than a threshold; and causing, by the processor, the left headlight and the right headlight to switch off when the vehicle is located the distance away from the external surface.

17. The method of claim 16, wherein the predefined action comprises automatically adjusting an alignment of at least one of the left headlight or the right headlight.

18. The method of claim 16, wherein the predefined action comprises outputting an alert notification via a vehicle human-machine interface (HMI) or a user device.

19. The method of claim 16 further comprising determining the first illumination intensity and the second illumination intensity based on at least one of a front camera exposure time or a front camera gain.

20. A non-transitory computer-readable storage medium having instructions stored thereupon which, when executed by a processor, cause the processor to:

obtain an image from a front camera associated with a vehicle, wherein the front camera is configured to capture the image of an external surface in front of the vehicle, and wherein the vehicle is located a predefined distance away from the external surface;

map a first set of image pixels of the image to a left zonal area of the external surface and a second set of image pixels of the image to a right zonal area of the external surface based on the predefined distance, wherein the left zonal area is configured to be illuminated by a left headlight when the left headlight is illuminated, and wherein the right zonal area is configured to be illuminated by a right headlight when the right headlight is illuminated;

determine a first illumination intensity associated with the left zonal area based on the first set of image pixels and a second illumination intensity associated with the right zonal area based on the second set of image pixels, when the left headlight and the right headlight are illuminated; and perform a predefined action when a difference between the first illumination intensity and the second illumination intensity is greater than a threshold; and cause the left headlight and the right headlight to switch off when the vehicle is located the predefined distance away from the external surface.

* * * * *